(12) United States Patent
Hornung (10) Patent No.: US 12,396,829 B2
(45) Date of Patent: Aug. 26, 2025

(54) EQUIPMENT FOR TREATMENT OF A PERSON

(71) Applicant: Forstgarten International Holding GmbH, St. Gallen (CH)

(72) Inventor: Frank Hornung, Geroda (DE)

(73) Assignee: FORSTGARTEN INTERNATIONAL HOLDING GMBH, St. Gallen (CH)

( * ) Notice: Subject to any disclaimer, the term of this patent is extended or adjusted under 35 U.S.C. 154(b) by 685 days.

(21) Appl. No.: 17/077,570

(22) Filed: Oct. 22, 2020

(65) Prior Publication Data

US 2021/0113312 A1    Apr. 22, 2021

Related U.S. Application Data

(63) Continuation of application No. 15/833,521, filed on Dec. 6, 2017, now abandoned.

(30) Foreign Application Priority Data

Dec. 9, 2016  (EP) .................................... 16203215

(51) Int. Cl.
| | |
|---|---|
| A61C 13/00 | (2006.01) |
| A61C 1/08 | (2006.01) |
| A61C 5/00 | (2017.01) |
| A61C 5/70 | (2017.01) |
| A61C 7/00 | (2006.01) |
| A61C 7/08 | (2006.01) |
| A61C 7/14 | (2006.01) |
| A61C 8/00 | (2006.01) |
| A61C 13/08 | (2006.01) |

(Continued)

(52) U.S. Cl.
CPC .......... *A61C 13/0004* (2013.01); *A61C 1/084* (2013.01); *A61C 5/00* (2013.01); *A61C 5/70* (2017.02); *A61C 7/002* (2013.01); *A61C 7/08* (2013.01); *A61C 7/14* (2013.01); *A61C 8/0028* (2013.01); *A61C 13/0019* (2013.01); *A61C 13/08* (2013.01); *A61C 19/04* (2013.01); *A61C 11/00* (2013.01)

(58) Field of Classification Search
CPC ................ A61C 13/0004; A61C 7/002; A61C 2007/004; A61C 19/04; A61C 19/045; A61C 19/05
See application file for complete search history.

(56) References Cited

U.S. PATENT DOCUMENTS

| 5,180,303 A | 1/1993 | Hornburg et al. |
| 5,605,459 A | 2/1997 | Kuroda et al. |

(Continued)

FOREIGN PATENT DOCUMENTS

EP    2702958 A1    3/2014

OTHER PUBLICATIONS

European Search Report for EP16203215, mailed Oct. 19, 2017.*

*Primary Examiner* — Edward Moran
(74) *Attorney, Agent, or Firm* — McDonnell Boehnen Hulbert & Berghoff LLP (57) ABSTRACT

It is provided an equipment for treatment of a person, wherein the equipment is configured to achieve a target denture geometry characterized by a target denture plane (3), the target denture plane lying parallel to an internal ear line (11) through a left internal ear point (7) and a right internal ear point (9) of the person. Further, a manufacturing method is provided.

18 Claims, 7 Drawing Sheets

(51) Int. Cl.
*A61C 19/04* (2006.01)
*A61C 11/00* (2006.01)

(56) References Cited

U.S. PATENT DOCUMENTS

| | | | |
|---|---|---|---|
| 9,084,653 B2* | 7/2015 | Jordan | A61C 9/0046 |
| 9,855,114 B2* | 1/2018 | Chen | A61C 7/002 |
| 10,258,439 B1* | 4/2019 | Kitching | A61C 7/002 |
| 2004/0110108 A1 | 6/2004 | Weissbach et al. | |
| 2005/0244769 A1 | 11/2005 | Keles et al. | |
| 2008/0044786 A1 | 2/2008 | Kalili et al. | |
| 2013/0095446 A1* | 4/2013 | Andreiko | A61C 7/002 128/848 |
| 2014/0106303 A1 | 4/2014 | Giasson et al. | |

* cited by examiner

EQUIPMENT FOR TREATMENT OF A PERSON

CROSS-REFERENCE TO RELATED APPLICATIONS

The present application is a continuation of U.S. patent application Ser. No. 15/833,521 filed Dec. 6, 2017, which claims priority to EP Patent Application No. 16203215.5 filed Dec. 9, 2016. The entire disclosure contents of these applications are herewith incorporated by reference into the present application.

FIELD

The present invention relates to an equipment for treatment of a person, in particular a dental equipment for treating a person and further relates to a method for arranging and/or manufacturing equipment for dental treatment of a person.

BACKGROUND

For treatment of a person regarding restoration of teeth, readjustment of teeth positions, designing a filling, an inlay or a crown for one or more teeth, information regarding the orientation and position of a denture plane or biting plane which is desired to be achieved may be required. Conventionally, the position of external ear openings and also the position of the jaw joints have been considered for determining the denture plane or biting plane. This method has widely been used also by orthodontists. Further, also a so called Camper plane as defined by Peter Camper in the 18$^{th}$ century has been considered as an auxiliary line or auxiliary plane for determining the biting plane which was further defined in relation to outer features of the cranium or skull and also the location of the outer ears.

In the orthodontist praxis it has however been observed that treatments of a person based on the conventionally determined biting plane or denture plane does not in all situations lead to a satisfactory result. In this context, it has been observed that a conventional treatment often results to strain and a distortion of the chewing motion leading to subsequent sufferings by the treated person. It seems, that the correct positioning and orientation of the teeth arches in the upper jaw and the lower jaw are not accurately determined based on conventionally used anatomical features, such as the Camper plane or outer ear entrances. Due to the presumably incorrect definition of the positioning and geometry of the teeth arches in the upper jaw and the lower jaw a physiologically perfect chewing function may not be achieved using conventional technology.

It has been observed, that conventionally an erroneous positioning of up to five millimeters and a defective orientation of the individual biting plane of up to three degrees may result. These defective positioning and orientation may result in long-term consequences involving massive jaw joint strain and loads and a considerable malfunction requiring corrections of the denture. As a consequence, any conventional procedure aiming to achieve an ideal state turned out to be biomechanically kinematically and physiologically improper.

Thus, there may be a need for an equipment, in particular dental equipment for treating a person, and there may be a need for a method for arranging, in particular manufacturing, equipment for treatment of a person, wherein problems of the prior art are reduced or even obviated. In particular, there may be a need for a dental equipment for a treatment of a person which may ensure to achieve a biomechanically correct chewing geometry, correct biting geometry and correct chewing motion.

SUMMARY

The need may be solved by the subject matter of the independent claims. Particular embodiments according to the present invention are defined in the dependent claims.

According to any embodiment of the present invention it is provided equipment for treatment of a person, wherein the equipment is configured to achieve a target denture geometry characterized by a target denture plane, the target denture plane lying parallel to an internal ear line through a left internal ear point and a right internal ear point of the person.

The equipment may be suitable for performing a dental treatment (e.g. treating one of more natural and/or artificial teeth, treating denture bone structures), a orthodontist treatment or in general a treatment relating to a biting motion and/or biting geometry and/or denture geometry. The equipment may be configured for various purposes, such as for replacement of one or more teeth, for restoration of one or more teeth, for readjustment of position and/or orientations of one or more teeth or for example for placing one or more implants into a jaw of a person. The physical structure, geometry and constitution of the equipment may reflect the target denture plane, which characterizes the target denture geometry. Thereby, the physical structure or geometry of the equipment may not directly reflect the target denture plane but may reflect the geometry or configuration of one or more intermediate denture planes which finally converge to the target denture plane.

When the equipment is applied to the person, the geometry of a start denture geometry may be altered in one step or in two or more steps towards the target denture geometry. The application of the equipment may for example involve inserting an implant, applying a filling or a crown, applying an inlay, fixing a bracket or an aligner or defining a drilling location and/or orientation for placement of an implant or a holder for an implant.

The target denture geometry may be defined by a geometry of chewing surfaces of (natural and/or artificial) teeth of the upper jaw and the lower jaw. Thereby, in the upper jaw and the lower jaw, the teeth may form teeth arches, wherein in the upper jaw and the lower jaw, the chewing surfaces of the teeth or the teeth arches approximately may lie in the target denture plane, when the teeth of the upper jaw are in contact with the teeth of the lower jaw in a biting state. Thereby, the target denture plane may be defined as a plane which results from fitting a plane to the chewing surfaces of the teeth, in particular the molar teeth, in the biting state, in particular by minimizing the deviations of the biting surfaces from the target denture plane. The target denture plane may thus for example be obtained by determining a plane which minimizes the squared deviations from the actual chewing surfaces of the teeth of the upper jaw and the lower jaw in the biting state according to the target denture geometries. The target denture geometry may be defined as a target geometry of (natural and/or artificial) teeth, in particular target geometry of their chewing surfaces. The target denture plane may be defined as a plane that minimizes the squared deviations from the target geometry of the surfaces of the teeth, in particular molar teeth, arranged according to the target denture geometry.

The target denture geometry and thus also the target denture plane may be different from a conventionally defined target denture geometry. The target denture plane lies parallel to the internal ear line. The internal ear line is a line, which runs through a left internal ear point and a right internal ear point of the person. The internal ear points are different from conventionally used positions of an (outer) entrance to an ear channel or ear canal. The internal ear point may be a point within or at the middle ear or within the inner ear. In particular, the internal ear point may be different from any location within or at an entrance of the ear channel, but may be a location at the corresponding eardrum or a location beyond the eardrum towards the interior of the ear. When the target denture plane lies parallel to the internal ear line the resulting target denture geometry may have improved functionality with respect to biomechanics, less strain, less load during a biting motion, compared to conventionally defined target denture geometries.

According to any embodiment of the present invention an auxiliary plane is determined based on a left triangle plane of a left triangle defined by the left internal ear point, the right internal ear point and a left eye point of a left eye, and/or on a right triangle plane of a right triangle defined by the left internal ear point, the right internal ear point and a right eye point of a right eye, the internal inner ear line lying within the auxiliary plane, wherein the auxiliary plane rotated around a rear rotation axis being parallel to the internal ear line about an angle between 11° and 17°, in particular between 13° and 15°, downwards results in the target denture plane.

The left triangle is a triangle having as triangle points the left internal ear point, the right internal ear point and the left eye point. The left triangle plane is a plane lying in the left triangle i.e. such that the left internal ear point, the right internal ear point and the left eye point all lie within the left triangle plane.

The right triangle has as triangle points the left internal ear point, the right internal ear point and the right eye point. The right triangle plane lies in the right triangle, such that the left internal ear point, the right internal ear point and the right eye point all lie within the right triangle plane.

The auxiliary plane may for example be oriented and positioned (exactly) as the left triangle plane, maybe oriented and positioned (exactly) as the right triangle plane or may be arranged and oriented as an average between the left triangle plane and the right triangle plane. The internal ear line may lie within the auxiliary plane. To obtain the target denture plane, the auxiliary plane is rotated about a rotation axis parallel to the internal ear line downwards (so that portions of the rotated auxiliary plane are below the eye points). Depending on the location of the rotation axis parallel to the internal ear line, it may further be required to translate the plane which has been obtained after rotating the auxiliary plane around the rotation axis. It may always be possible to find an appropriate (location of a) rear rotation axis such that the target denture plane is obtainable by a pure rotation of the auxiliary plane around the suitable rear rotation axis without requiring to further translate the rotated auxiliary plane. Thereby, a simple procedure for obtaining the target denture plane may be provided. The angle may be further adjusted or selected in the range between 11° and 17°, in particular between 13° and 15°, depending on individual anatomical features, such as the geometry of the upper jaw or internal anatomical structures, such as bone structures within the skull.

According to an embodiment of the present invention an orientation of the auxiliary plane is determined as an average of an orientation of the left triangle plane and an orientation of the right triangle plane.

The left triangle plane may be characterized with respect to its orientation by a left triangle plane normal vector (e.g. three-tuple) and the right triangle plane may be characterized regarding its orientation by a right triangle plane normal vector. An (e.g. arithmetic or geometrical) average (e.g. component wise average) may be calculated from the left triangle plane normal vector and the right triangle plane normal vector to obtain an auxiliary plane normal vector being a normal vector of the auxiliary plane. This embodiment is in particular advantageous, if the left triangle plane and the right triangle plane are not parallel to each other due to asymmetry of the location of the eyes (e.g. different vertical positions) with respect to the location of the internal ear points.

According to an embodiment of the present invention the rear rotation axis is obtained by constructing a connecting line intersecting the internal ear line in the middle between the left internal ear point and the right internal ear point and intersecting an eye line in the middle between the left eye point and the right eye point, by obtaining a connection length of the connecting line between the internal ear line and the eye line, by extending the connecting line towards the rear by between 1.7 and 2.3, in particular between 1.9 and 2.1, times the connection length, the end of the extended connecting line defining the position of the rear rotation axis.

The connecting line connects the internal ear line and the eye line, such that the connecting line intersects the internal ear line in the middle between the left internal ear point and the right internal ear point and such that the connecting line intersects the eye line in the middle between the left eye point and the right eye point. In the ideal case, in which the person has (mirror) symmetry related internal ear points and (mirror) symmetry related eye points, the connecting line may include a right angle with the internal ear line and may also include a right angle with the eye line. In the general case however, in which the person does not exhibit mirror symmetry related internal ear points and mirror symmetry related eye points, the connecting line may include an angle differing from 90° with the internal ear line and may also include an angle different from 90° with the eye line. The connecting line may however lie within an approximate mirror symmetry plane (e.g. orthogonal to one of both of the triangle planes).

The length of the connecting line between the internal ear line and the eye line is the connection length. When the connecting line is extended towards the rear by between 1.7 and 2.3, the endpoint may define the position of the rear rotation axis. Thus, the rear rotation axis is defined to run through the end of the extended connecting line. When the rear rotation axis is defined in this manner, the target denture plane may be obtained by a pure rotation of the auxiliary plane downwards around the rear rotation axis without requiring to further translate the rotated auxiliary plane. Thereby, a simple procedure for obtaining the target denture plane may be provided.

According to an embodiment of the present invention the auxiliary plane is rotated around the internal ear line, or an axis parallel to the internal ear line, about an angle between 11° and 17°, in particular between 13° and 15°, downwards and translated, in particular downwards, to obtain the target denture plane.

This embodiment may be usable without requiring the definition of the location of the rear rotation axis. A rotation of the auxiliary plane around an axis parallel to the internal ear line may be performed and then the auxiliary plane maybe translated by a distance such that the translated rotated auxiliary plane matches with anatomical structures of the upper jaw and/or anatomical structures of (remaining) teeth, in particular their chewing surfaces. The distance of translation may be adjusted such as to minimize deviations between the (remaining) teeth or chewing surfaces of the remaining teeth from the translated rotated auxiliary plane. Thereby, an adjustment according to the individual anatomical constitution of the person may be achieved.

According to an embodiment of the present invention the target denture geometry being further defined by a target geometry of an upper teeth arch and a lower teeth arch such that, in each teeth arch, teeth are positioned such that a teeth connecting line connecting symmetry related teeth in the lower teeth arch or the upper teeth arch is parallel to the internal ear line, wherein the target geometry of the upper teeth arch and the lower teeth arch may be achieved in one step or step by step including one or more intermediate geometries.

The target geometry of the upper teeth arch and the lower teeth arch may be defined by the corresponding target geometry of chewing surfaces of the upper teeth arch and the lower teeth arch in a bite state, in which (some or all of) the chewing surfaces of the upper teeth are in contact with (some or all of) the chewing surfaces of the lower teeth. The upper teeth arch and the lower teeth arch may comprise natural or/and artificial teeth or/and one or more implants and/or supplements. Further, the target geometry may be defined by chewing surfaces of one or more restored teeth. The teeth may be characterized or identified by their position number from the midline (lying in a (approximate) mirror symmetry plane between right and left teeth). Thereby, symmetry related teeth may be teeth in the upper jaw or the lower jaw which have a same position number from the midline. The teeth connecting line may be a line approximately lying within two chewing surfaces of symmetry related teeth. In the ideal or target denture geometry the symmetry related teeth have a teeth connecting line being parallel to the internal ear line. In a start denture geometry the symmetry related teeth may have a teeth connecting line being not parallel to the internal ear line. This may result in strain and high load during a chewing motion. Thereby, the equipment for treatment of the person may be configured such as to establish a state that one teeth connecting line or one or more teeth connecting lines or all teeth connecting lines of symmetry related teeth are parallel to the internal ear line. The target denture geometry may be achieved in one or more steps also involving one or more intermediate steps of the geometry of the upper teeth arch and the lower teeth arch. The teeth connecting line may also be referred to a transversal line in the following.

According to an embodiment of the present invention the left eye point is one of: a location, in particular of a center or of a highest curvature, of the cornea of the left eye, a location, in particular center of the eyeball, of the left eye, the right eye point being a location of the corresponding anatomical structure of the right eye. The eye point may be defined to be other points relating to the eyes of the person.

According to an embodiment of the present invention the equipment comprises at least one of a set of intermediate equipment portions that are configured to achieve the target denture geometry having the target denture plane starting form a start denture geometry characterized by a start denture plane in plural stages involving successively achieving transitional denture planes that are between the start denture plane and the target denture plane.

According to this embodiment the equipment may comprise several portions (such as forming a set for different treatment phases), which may be applied successively during the treatment of the person. For example, a first equipment portion may be applied when starting a treatment starting from a start denture geometry. The first equipment portion may be adapted to achieve, starting from the start denture geometry, a first intermediate denture geometry or a first transitional denture geometry characterized a first transitional denture plane. Application of the first equipment portion may last for a particular time interval, such as several days, several weeks or several months. After having applied the first equipment portion for the particular time interval a first transitional target denture geometry being characterized by a first transitional denture plane may have been achieved. Subsequently, a second intermediate equipment portion (being different in structure from the first intermediate equipment portion) may be applied to the person aiming to achieve a second transitional denture geometry characterized by a second transitional denture plane, being even more closer to the target denture plane than the first transitional denture plane. After having applied the second intermediate equipment portion for another time period, a third intermediate equipment portion (being different in structure from the second intermediate equipment portion) may be applied to achieve a third denture geometry being characterized by a third transitional denture plane, more closely resembling the target denture plane than the second transitional denture plane. This procedure may continue using further intermediate equipment portion each being adapted or configured to achieve a further transitional denture plane converging to the target denture plane, such that at the end of the treatment sequence involving application of the different intermediate equipment portions, finally the target denture geometry characterized by the target denture plane is achieved. Thereby, an effective treatment aiming at a proper target denture geometry may be provided.

According to an embodiment of the present invention the equipment is configured to achieve the target denture geometry having the target denture plane starting form a start denture geometry characterized by a start denture plane in one stage without achieving transitional denture planes.

According to this embodiment no intermediate equipment portions may be required for the treatment of the person. The equipment may be instead be configured to, starting from a start denture geometry, to (directly) achieve the target denture geometry characterized by the target denture plane without aiming at intermediate denture planes. This embodiment may for example be applicable for total replacement of teeth or application of an artificial denture.

According to an embodiment of the present invention the target denture geometry is characterized by chewing surfaces of teeth approximately lying in the target denture plane but deviating downwards from the target denture plane in a middle region between the incisor teeth and the last molar tooth.

The teeth arranged according to the target denture geometry or the chewing surfaces of the teeth arranged according to the target denture geometry may only approximately lie within the target denture plane. The chewing surface of the teeth may deviate from the target denture plane downwards in the middle region between the incisor teeth and the last molar teeth. In the front part and in the rear part the chewing surfaces of the teeth arranged according to the target denture geometry may deviate upwards from the target denture plane. The deviations may be due to natural biting forces which may primarily apply to the middle portion. The deviation downwards and upwards from the target denture plane may relate to the chewing surfaces of the teeth of the lower jaw. The chewing surfaces of the teeth of the upper jaw may also deviate downwards in the middle region and may deviate upwards in the front region and the rear region from the target denture plane.

According to an embodiment of the present invention the equipment comprises at least one of: a dental auxiliary structure (for repositioning of teeth), a dental brace, a dental retainer, a bracket, a dental aligner, a bore pattern, a bore model, a boring template, an overdenture, an overlay prosthesis, a dental prosthesis, a transitional dental prosthesis, a dental crown, an inlay, a dental filling, an artificial tooth, an implant. Also combinations of the above-described items may form the equipment according to embodiments of the present invention.

According to an embodiment of the present invention the left internal ear point is a location of an anatomical structure within the middle ear or the inner ear, in particular one of:
 a location, in particular center, of the left eardrum,
 a location, in particular center, of the left cochlea,
 a location of a left ear bone or ossicle directly or indirectly connected to the left eardrum,
 a location of the utricle or the saccule of the left inner ear,
 a location of the malleus or hammer of the left ear,
 a location of the incus of the left ear,
the left internal ear point being different from a location of an, in particular entry into the, left outer ear canal, the right internal ear point being the location of the corresponding anatomical structure of the right ear. Other definitions of the internal ear points are possible, as long as the internal ear points are different from a location of outer ear channels.

It should be understood that features, individually or in any combination, described, disclosed, explained or provided for an equipment for treatment of a person may also be applied to a method for arranging, in particular manufacturing, equipment for treatment of a person according to an embodiment of the present invention and vice versa. System features may also be expressed as method features and vice versa.

The equipment for treatment of a person may be manufactured by a method according to an embodiment of the present invention.

According to an embodiment of the present invention a method for arranging, in particular manufacturing, equipment for treatment of a person, the method comprising measuring a left internal ear point and a right internal ear point of the person, defining an internal ear line through the left internal ear point and the right internal ear point, defining a target denture plane lying parallel to the internal ear line, and configuring the equipment such that applying the equipment to the person achieves a target denture geometry characterized by the target denture plane.

The internal ear points may be measured by conventionally known methods, like X-ray imaging, NMR imaging, optical scanning/imaging or other methods.

The method may be implemented (at least partly) in software and/or in hardware as a computer implemented invention. 3D imaging methods may for example be used to determine or localize anatomical structures used in the method. A user may recognize e.g. the internal ear points on a screen displaying a measured 3D volume of the skull of the person. The user may mark the internal ear points, thereby defining (and displaying) the internal ear line. Further the eye points may be automatically recognized (or by a user) and the triangle(s) may thereby be defined and displayed. Based on the triangles the auxiliary plane may defined (and displayed). Further the rear rotation axis may be derived and displayed. Finally, the target denture plane may be determined and displayed on the screen. Construction data describing the target denture plane (and optionally other anatomical details) may be output and supplied to a manufacturing system. Based on the construction data the equipment may for example be manufactured by 3D printing or 3D lithography.

BRIEF DESCRIPTION OF THE DRAWINGS

Embodiments of the present invention will now be described with reference to the accompanying drawings. The invention is not restricted to the illustrated or described embodiments.

DETAILED DESCRIPTION

Embodiments of the present invention enable manufacturing, dimensioning and positioning of dental medical auxiliary structures and equipment or implants and further provide the manufactured equipment and implants. Basis of the equipment and the manufacturing methods and placement methods may be three dimensional high resolution imaging/positioning information regarding the middle ear and/or the inner ear system on one hand and the eye system or cornea system on the other hand. Based on the spacial arrangement of particular points in or at the interior ear (particular middle ear or inner ear) and the eyes of the patient, a position and a dimension of a cranial base plane (also referred to as an auxiliary plane above) may be determined. Relative to the cranial basic plane the dimension and the position of a chewing base plane (also referred to as a target denture plane above) is determined using a defined geometrical mapping and/or calculation. Based on the chewing base plane the biomechanically correct 3D structure, position and dimensioning of the elements of the teeth arches and the individualized chewing surfaces are determined. Based on the interior ear axis (in particular inner ear axis) arrangements may be manufactured or/and positioned, to achieve or result in a desired three dimensional arrangement of the teeth. In contrast to the conventional technology embodiments of the present invention may utilize geometrically defined localization points within the inner ear or/at the eardrum of the patient, the inner ear axis (also referred to as internal ear line above) defining a reference axis.

To define, based on the inner ear axis, a cranial plane, embodiments of the present invention utilize a position of at least one eye or of both eyes. The connecting lines from the (e.g. cornea of the) eyes to the inner ear axis form sides of a trapezoid. In symmetric case, the eyes and the inner ear points are in one plane and the trapezoid is symmetrical. The symmetrical case is an exceptional case.

The cranial base plane or cranial base area may also be referred to as auxiliary plane or auxiliary area in the following. The ideal chewing base plane or ideal chewing base area may also be referred to as target denture plane in the following.

Figure 1:
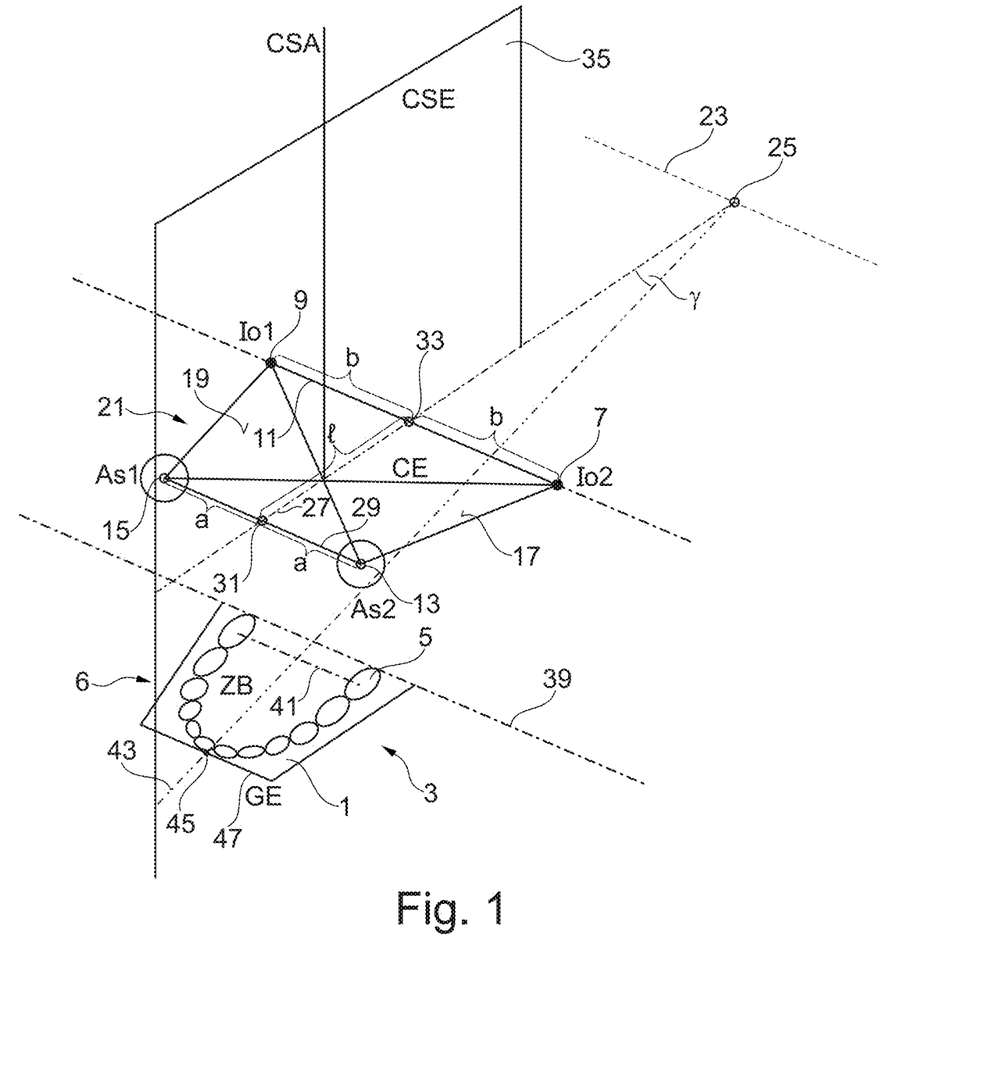
FIG. 1 schematically illustrates in a three dimensional view an embodiment of constructing a target denture plane as used in equipment for treatment of a person and as applied for manufacturing an equipment for treatment of a person according to an embodiment of the present invention.

FIG. 1 schematically illustrates a three dimensional view for illustrating the definition of a target denture plane as used in the embodiment of the present invention. A target denture area 1 lies in a target denture plane 3. The target denture plane 3 characterizes a target denture geometry of teeth 5 of an upper teeth arch and a lower teeth arch (of which only a lower teeth arch is illustrated in FIG. 1). The target denture geometry 3 may be defined by chewing surfaces of the teeth 5. The chewing surfaces of the (natural and/or artificial) teeth 5 are supposed or aimed at (after successful treatment) to at least approximately lie in the target denture plane 3. Thereby, the chewing surfaces of the teeth 5 may, in the target state, slightly deviate from the target denture plane 3 downwards and upwards. The target denture plane may be considered as a plane in which the chewing surfaces of the teeth (are aimed to) lie in a biting state, i.e. in a state where the chewing surfaces of the teeth 5 of the upper teeth arch are in contact with the chewing surfaces of the teeth of the lower jaw.

The target denture plane 3 may be constructed for manufacturing equipment for a treatment of a person. The target denture plane 3 may be obtained as follows:

A left internal ear point 7 may be measured by a conventionally known method such as some imaging methodology. The left internal ear point 7 for example defines a location of the left eardrum or an anatomical structure within the left inner ear. Further, a right internal ear point 9 may also be determined by measuring. An internal ear line 11 is a line connecting the left internal ear point 7 and the right internal ear point 9.

Furthermore, a left eye point 13 and also a right eye point 15 may be determined, for example by measuring a location of a particular anatomical structure within or at the corresponding eye. A left triangle may be defined by the left ear point 7, the right internal ear point 9 and the left eye point 13. The left triangle defines a left triangle plane 17.

Further, a right triangle may be defined by the left internal ear point 7, the right internal ear point 9 and the right eye point 15. The right triangle lies in a right triangle plane 19.

Further, an auxiliary plane 21 (also referred to as cranial base plane or cranial base area) may be defined based on the left triangle plane 17 and/or based on the right triangle plane 19. In one embodiment the auxiliary plane 21 may be defined as an average between the left triangle plane 17 and the right triangle plane 19.

To obtain the target denture plane 3, the auxiliary plane 21 is rotated around a rear rotation axis 23 which is parallel to the internal ear line 11 about an angle γ downwards. The angle γ may amount to between 13° and 15°, for example.

For defining the position of the rear rotation axis 23 the point 25 may be constructed as follows:

A connecting line 27 is constructed which intersects the internal ear line 11 in the middle between the left internal ear point 7 and the right internal ear point 9. The connecting line 27 further intersects an eye line 29 in the middle between the left eye point 13 and the right eye point 15. Thus, the distance 'a' between the right eye point 15 and the intersection point 31 where the connecting line 27 intersects the eye line 29 is as great as the distance 'a' between the intersection point 31 and the left eye point 13. Further, the distance 'b' between the right internal ear point 9 and an intersection point 33 where the connecting line 27 intersects the internal ear line 11 is as great as the distance 'b' between the intersection point 33 and the left internal ear point 7.

Between the intersection points 31 and 33 the connecting line 27 has a length 'l'. The connecting line 27 is extended towards the rear by between 1.9 and 2.1 times the connection length 'l' to obtain the point 25 through which the rear rotation axis runs.

The connecting line 27 lies in an approximative mirror symmetry plane 35. In reality, there is only an approximative mirror symmetry between anatomical structures (of the denture) on the left hand side and the right hand side. The target denture plane 3 may be obtained starting from the auxiliary plane 21 by a performing a rotation about the rear rotation axis 23 without performing an additional translation.

Alternatively to the above described embodiment the target denture plane 3 may also be obtained starting from the auxiliary plane 21 by rotating the auxiliary plane 21 around an axis parallel to the internal ear line 11, for example around the internal ear line 11 itself. In this case however, an additional translation has to be performed in order to arrive at the target denture plane 3.

The target denture area 1 (enclosing intended teeth arches in the target state) may be obtained by adjustment (e.g. resizing and/or distorting) of the rotated quadrangle (in particular trapezoid) defined by the left internal ear point 7, the right internal ear point 9, the left eye point 13 and the right eye point 15.

The approximate mirror symmetry plane 35 runs through the intersection points of the diagonals of the trapezoid or quadrangle resembling a trapezoid, the quadrangle defined by the left internal ear point, the right internal ear point, the right eye point 15 and the left eye point 13.

In the ideal case the quadrangle defined by the left internal ear point 7, the right internal ear point 9, the right eye point 15 and the left eye point 13 may form a trapezoid, but in the general case this quadrangle may only resemble a trapezoid, for example represented by a distorted trapezoid. In the general case therefore, the connecting line 27 is not orthogonal to the internal ear line 11 and may also not be orthogonal to the eye line 29.

The target denture geometry may also be characterized by a rear denture base line 39, which may run approximately tangentially at the rear end of the last molar teeth, wherein the rear denture base line 39 is parallel to the internal ear line 11. The angle γ about which the auxiliary plane 21 is to be rotated to obtain the target denture plane 3 may also depend on the height of the skull.

Figure 2:
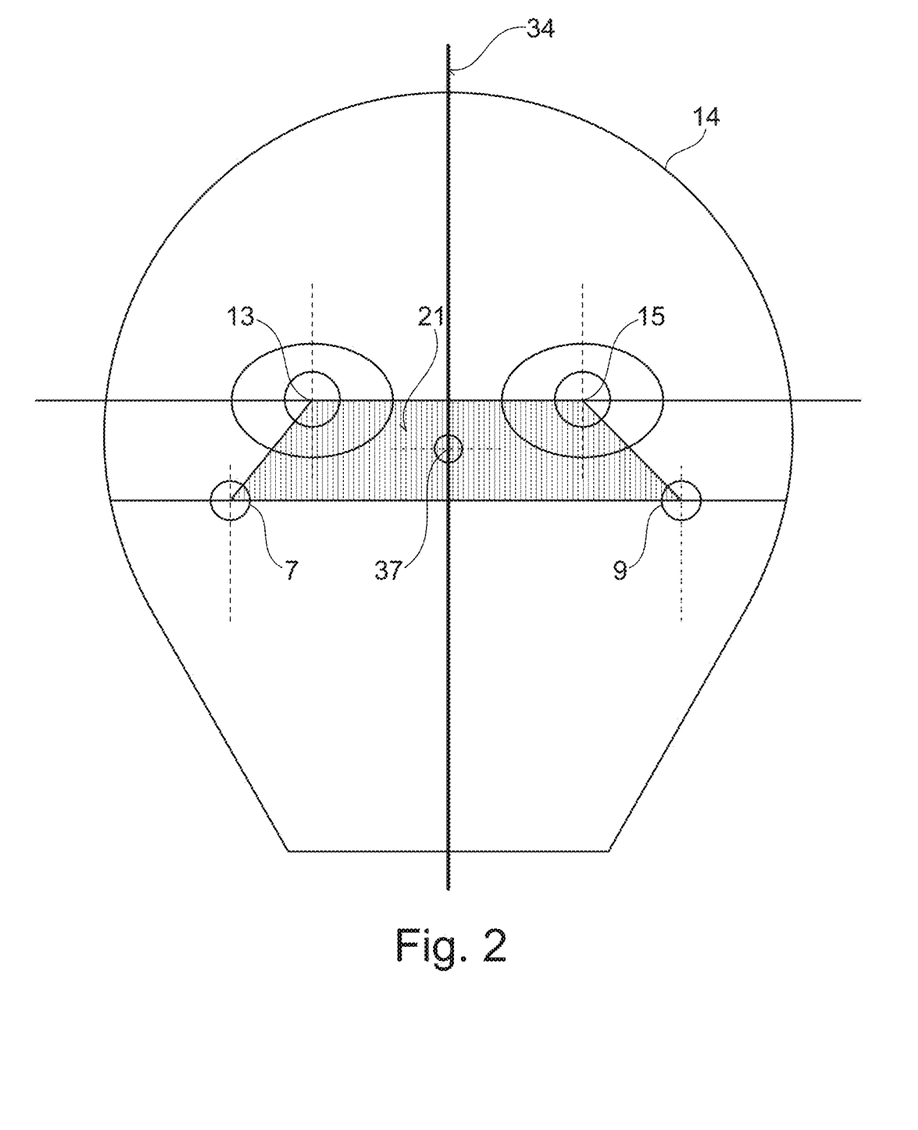
FIG. 2 schematically illustrates a rear view of a skull for explaining a construction of an auxiliary plane as used in embodiments of the present invention.

FIG. 2 schematically illustrates a back view of a skull 14 illustrating the construction of the auxiliary plane 21 in the special case that both eyes are at a same vertical position. In this particular case, the left internal ear point 7, the right internal ear point 9, the right eye point 15 and the left eye point 13 all lie in one plane i.e. the auxiliary plane 21. The point 37 may be referred to as a cranial axis point. The internal ear points 9 and 7 may for example define the localization of an incus of the corresponding ear. The eye points 13 and 15 may for example define the localization of the respective cornea where its curvature is highest.

In the general case, the two eyes may have different vertical positions resulting in the left triangle plane 17 having an orientation different from the orientation of the right triangle plane 19. Also in the general case an appropriate auxiliary plane 21 is definable, for example by averaging the orientations of the left triangle plane and the right triangle plane.

If the target denture plane 3 is defined by a rotation of the auxiliary plane 21 around an axis parallel to the internal ear line 11 being different from the rear rotation axis 23, the subsequent required translation of the rotated auxiliary plane 21 depends on the actual location of the chosen rotation axis.

Figure 3:
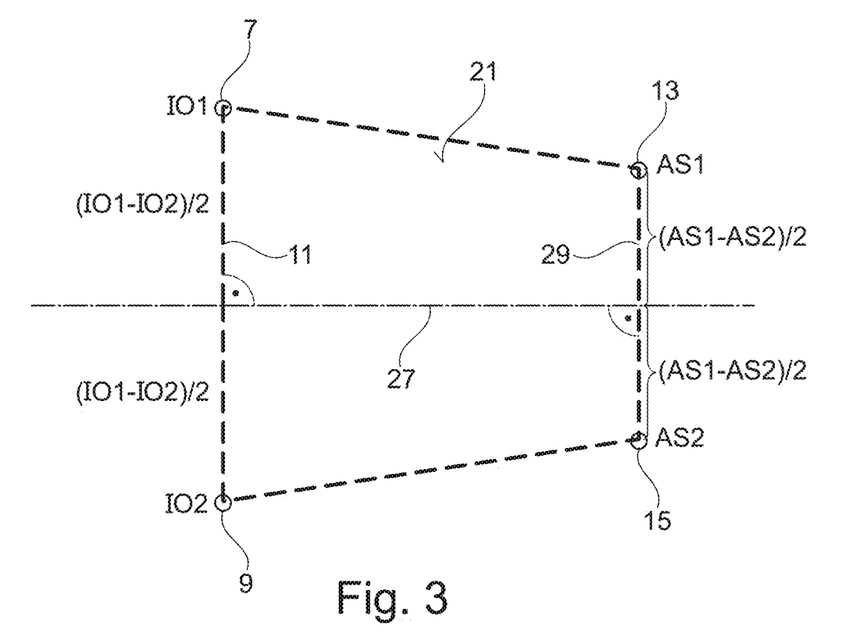
FIGS. 3 and 4 schematically illustrate elevational views of an auxiliary plane as defined according to embodiments of the present invention.
Figure 4:
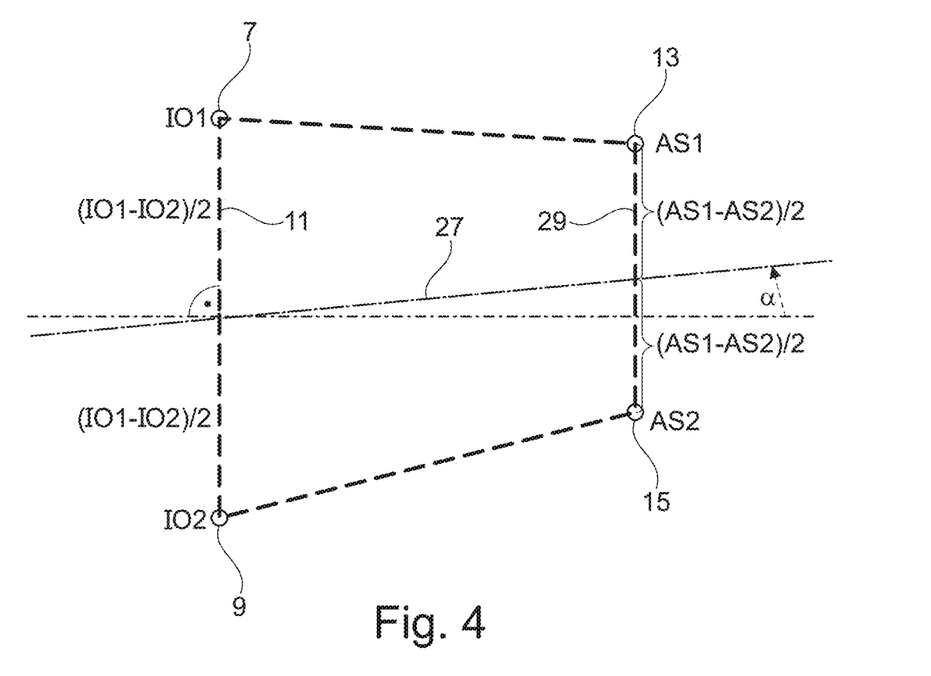

The target denture area 1 within the target denture plane 3 may also resemble a trapezoid, which may define an approximate limitation or border of the tooth arch in the upper jaw and the lower jaw. FIGS. 3 and 4 schematically illustrate elevational views for explaining an ideal symmetric case and an asymmetric case, respectively. In the symmetric case illustrated in FIG. 3, the connecting line 27 intersects the eye line 29 as well as the internal ear line 11 at right angles exactly in the middle between the left internal ear point 7 and the right internal ear point 9 and in the middle between the left eye point 13 and the right eye point 15, respectively.

In the (general) asymmetric case however, as is illustrated in FIG. 4, the connecting line 27 does not intersect the internal ear line 11 at a right angle and also does not intersect the eye line 29 at a right angle but deviates therefrom by the angle alpha. Nevertheless, the construction of the auxiliary plane based on the left triangle (defined by the left internal ear point 7, the right internal ear point 9 and the left eye point 13) and/or based on the right triangle (based on the left internal ear point 7, the right internal ear point 9 and the right eye point 15) is enabled and possible. In the situation as illustrated in FIG. 4, the quadrangle defined by the left internal ear point 7, the left eye point 13, the right eye point 15 and the right internal ear point 9 resembles a trapezoid, for example representing a distorted trapezoid.

Again referring to FIG. 1, the target denture geometry may further be characterized by (at least one) teeth connecting line 41 being parallel to the internal ear line 11 and thus also being parallel to the rear denture base line 39. Thereby, the connecting line 41 connects mirror symmetry related teeth (in a same jaw). Thereby, the symmetry related teeth may be those teeth that have the same positional numbering relative to the middle line 43. For example, the $6^{th}$ molar tooth on the left hand side is symmetry related to the $6^{th}$ molar tooth on the right hand side, the $5^{th}$ molar tooth is symmetry related to the $5^{th}$ molar tooth on the right hand side and the end molar tooth or the end tooth on the left hand side is symmetry related to the end tooth on the right hand side. Thereby, in particular the teeth connecting line 41 may approximately run within a chewing surface of the respective tooth. The teeth connecting line 41 may also be referred to as transversal line connecting symmetry related teeth. In the target denture geometry all symmetry related teeth may be connected by a corresponding teeth connecting line, which is parallel to the internal ear line 11.

The target denture geometry characterized by the target denture plane 3 (and additionally the orientation of the teeth connecting lines 41 being parallel to the internal ear line 11) may be reached or achieved starting from a start denture geometry in several steps or stages involving intermediate denture geometries characterized by transitional denture planes. In a side view, chewing surfaces of the teeth, when in the target denture geometry, my deviate from the target denture plane downwards in a region between the front teeth and the teeth most rearwards. The shape of a protection may resemble a so-called Spee curve. In anatomy, the Curve of Spee (called also von Spee's curve or Spee's curvature) is defined as the curvature of the mandibular occlusal plane beginning at the tip of the lower incisors and following the buccal cusps of the posterior teeth, continuing to the terminal molar. According to another definition the curve of Spee is an anatomic curvature of the occlusal alignment of the teeth, beginning at the tip of the lower incisor, following the buccal cusps of the natural premolars and molars and continuing to the anterior border of the ramus. It is named for the German embryologist Ferdinand Graf von Spee (1855-1937), who was first to describe the anatomic relations of human teeth in the sagittal plane.

According to the target denture geometry the center between the incisor teeth should be at the center between the eyes. The midpoint 45 between symmetry related incisor teeth according to the target denture geometry illustrated in FIG. 1 may be obtained by determining the intersection of the rotated and extended connecting line 27 with a front borderline 47 limiting the target denture area 1. Alternatively, the (pseudo-) mirror plane 35 may define where the midpoint 45 between symmetry related incisor teeth should be located. The connecting line 27 may lie within the (pseudo-) symmetry plane 35. Thereby, the (pseudo-) symmetry plane 35 may be orthogonal to the internal ear line 11 and may in the ideal case also be orthogonal to the eye line 29.

Also in the case, where no teeth are present, the definition of position and orientation of a target denture is possible based on the definition of the internal ear line (and optionally also the position of one or more eye points). Equipment according to embodiments of the present invention aims to establish teeth arches, which converge into the target denture geometry.

Figure 5:
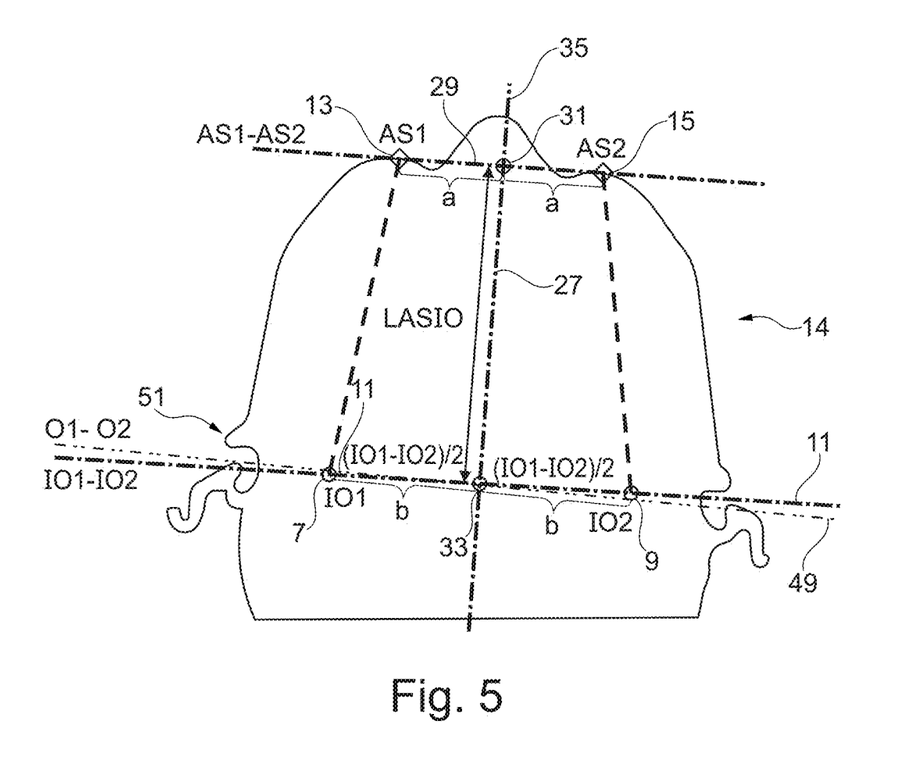
FIG. 5 schematically illustrates an elevational sectional view of a skull for explaining a construction of an auxiliary plane as used in embodiments of the present invention.

FIG. 5 schematically illustrates an elevational sectional view (as e.g. obtained by 3D imaging) of a human head with points and lines indicated, which are used in the embodiments according to the present invention. Herein, the left internal ear point 7 and the right internal ear point 9 define the internal ear line 11, where the line 49 is based on the anatomy of the outer ear 51, as has been used in conventional methods. As can be appreciated from FIG. 7, the outer ear line 49 deviates considerably from the orientation of the internal ear line 11. The internal ear line 11 is not necessarily parallel into the eye line 29. Embodiments according to the present invention may use the internal ear line 11 as a reference axis and may use the quadrangle (resembling a trapezoid) defined by the left internal ear point 7, the right internal ear point 9, the right eye point 15 and the left eye point 13 as a reference plane.

Figure 6:
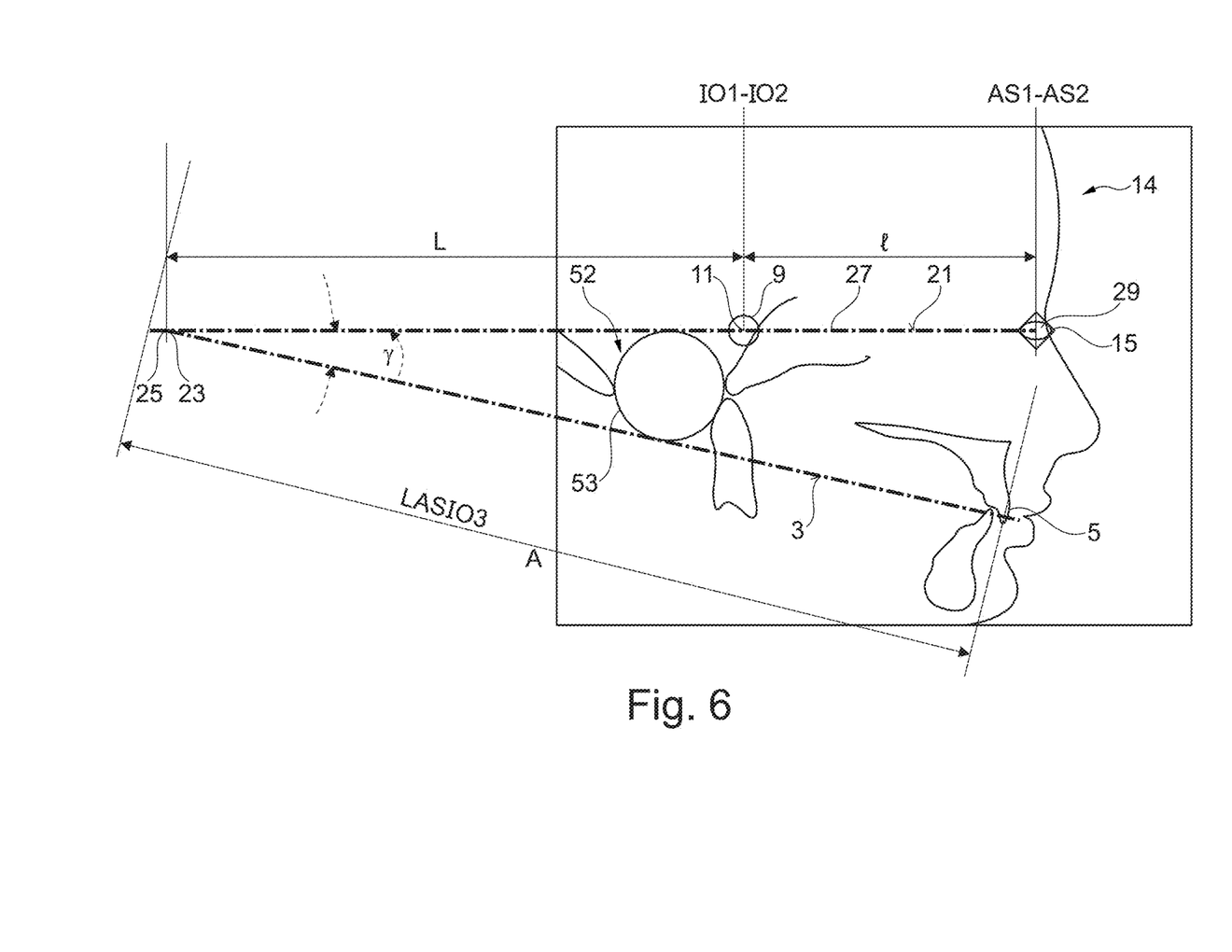
FIG. 6 schematically illustrates a side view of a skull for explaining a method for constructing a target denture plane as used in embodiments of the present invention.

FIG. 6 illustrates a side view of a persons head including lines and planes considered in embodiments according to the present invention. The internal ear line 11 is perpendicular to the drawing plane and runs through the left internal ear point 7 and the right internal ear point 9. The auxiliary plane 21 running through the left internal ear point 9 and the left eye point 15 is rotated around the rear rotation axis 23 downwards about an angle γ to obtain the target denture plane 3 defining an approximate location of chewing surfaces of the teeth of the upper jaw and the lower jaw in a biting state. The connecting line 27 having the length 'l' between the internal ear line 11 and the eye line 29 is extended towards the rear by a length 'L' in order to define the location of the rear rotation axis 23 at a point 25. Thereby, the distance 'L' may be around 1.9 to 2.1 times of the connection length 'l'. The distance 'A' from the point 25 on the rear rotation axis 23 to the front incisor tooth 5 may be around three times the connection length 'l'. The quantity A may be adjusted such that the incisor teeth match to the bones of the upper jaw.

According to an embodiment, a three dimensional sphere 53 may be fit into the foramen magnum 52 (a large oval opening in the occipital bone of the skull), as defined by bone structures within the scull. The extended connecting line 27 is tangentially touching the sphere 53. Also the projection of the target denture plane 3 tangentially touches the sphere 53. Thereby, the quantity γ, i.e. the rotation angle may be defined.

Figure 7:
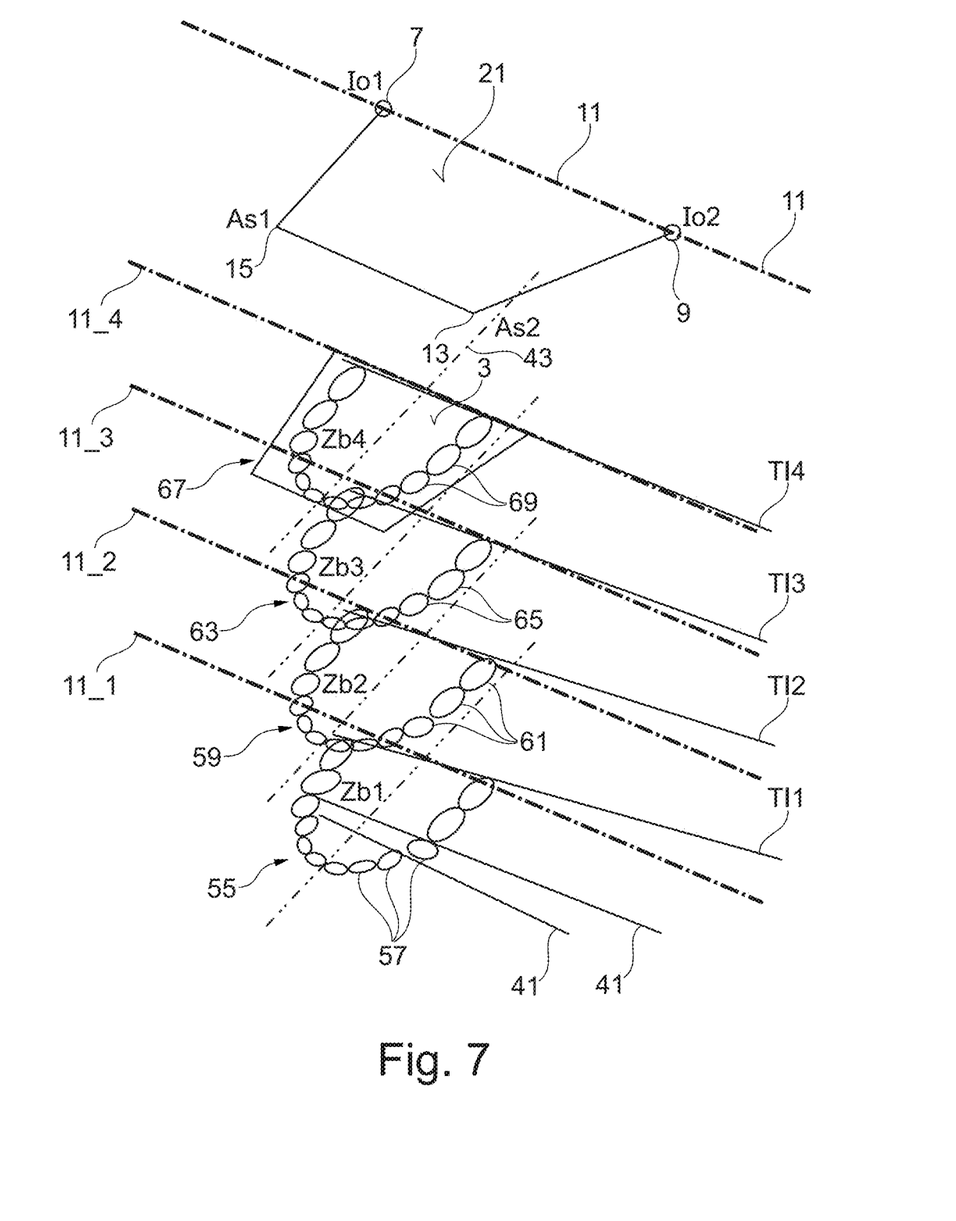
FIG. 7 schematically illustrates in a three dimensional view a sequence of a number of transitional denture planes as defined and used in embodiments of the present invention.

FIG. 7 schematically illustrates transitional denture planes as considered for manufacturing or arranging different intermediate equipment portions aiming finally to achieve a target denture geometry characterized by a target denture plane.

For example, a set of aligner structure for readjusting the arrangement of teeth in the denture may be configured to successively achieving one of the transitional denture planes. During the transitional stages the target denture geometry is not achieved but only an intermediate state is achieved, wherein the intermediate denture geometry is characterized by a transitional denture plane, which however converge to the target denture plane. Embodiments of the present invention allow a biomechanically and physiologically proper precise spacial forming and positioning of the chewing surfaces. This may also be possible, when the jaw has a misalignment or improper positioning or also in the case where only a small number of teeth remain in the denture.

By applying aligning and measurement reference points and reference lines, in particular an internal ear line may be obtained based on which the configuration, geometry, positioning and dimensioning of teeth arches and/or auxiliary equipment is enabled. Based on the target denture geometry of the chewing faces of the individual teeth arches of the upper jaw or the lower jaw, auxiliary equipment and/or implants and other dental supplements may be manufactured or brackets may be arranged such that a biomechanically and physiologically ideal denture may be achieved.

The internal ear line may for example define as a line through the hammer of the left ear and the hammer of the right ear. According to embodiments of the present invention teeth arches may be generated or manufactured or may be corrected within the upper jaw or the lower jaw.

Thereby, the equipment may for example be manufactured by 3D printing or 3D lithography. The equipment may be suitable for serving as supplement, serving as replacement or serving as adjustment means for adjusting the positioning of teeth.

Basis for the manufacturing the equipment may be a three dimensional data set, in particular three dimensional X-ray data set of the head of the person including the upper jaw and the lower jaw. From the three dimensional data set the left internal ear point and the right internal ear point may be (automatically or manually) determined. These two internal ear points define the internal ear line. Further, the left eye point and the right eye point may be measured, for example using the same three dimension data set by detecting contrast within the three dimensional reconstruction. Based on these four points the triangles may be defined and the corresponding triangle planes may be defined. Based on the triangle plane(s) the auxiliary plane may be defined. Furthermore, using a reconstruction as explained above, the location of the rear rotation axis may be established and the rotation of the auxiliary plane may be performed in order to arrive at the target denture plane.

Embodiments of the present invention may be utilized for orthodontist treatment. Thereby, the equipment may for example comprise a set of intermediate equipment portions, such as brackets, aligner or other elements suitable for positional adjustment of one or more teeth. The aligner or brackets may apply a torque and a translational force to one or more teeth in order to effect a repositioning of the teeth. Due to the improved definition of the target denture geometry the dental treatment success may be improved relative to conventional methods. The orientation of the target denture plane may be based on the orientation of the internal ear line. Relative to the internal ear line rotation and a translation may be performed. Also transversal lines connecting symmetry related teeth may be, in the target denture geometry, parallel to the internal ear line. The readjustment or the establishment or generation of the teeth in the denture may be achieved in a single step or in a number of steps involving transitional stages.

According to the embodiment of the present invention the equipment for treatment comprises a retainer, a brace, in particular a dental brace, further in particular having brackets to be attached at teeth. Thereby, the positioning of the teeth may be altered using the treatment equipment such that a teeth connecting line connecting symmetry related teeth (for example connecting molar tooth no. 6 on the right hand side with the molar tooth no. 6 on the left hand side) is oriented parallel to the internal ear line. Furthermore, the brackets may be attached or adhered to the teeth such that step by step starting from a starting denture geometry transitional denture geometry are achieved which converge to the target denture geometry. In the target denture geometry, symmetry related teeth are positioned such that a tooth or teeth connecting line is parallel to the internal ear line. Thereby, the transversal lines (teeth connecting lines) may step by step approach the orientation parallel to the internal ear line.

According to another embodiment the equipment for treatment comprises an aligner structure for aligning teeth towards the target denture geometry. In particular, a set of intermediate aligner elements may be provided which, step by step, align the teeth towards the target denture geometry.

According to another embodiment the equipment for treatment comprises a bore pattern, a bore model or a boring template for inserting implants. Thereby, the location of bores to be drilled and also the direction along which the drilling is to be performed may be defined such that a target denture geometry may be achieved when finally the implants are inserted or attached to pins implanted at the persons bone structure. Further, the inclination and the exit opening must be configured such that the artificial tooth may be properly positioned. Herein, the ideal positioning of the teeth within the teeth arch of the supplement may be virtually realized based on a target denture geometry, which relies on the internal ear line. Thereby, the teeth are placed as close as possible to the target denture geometry. Based on the virtual positioning of the teeth the bore pattern may be generated.

According to other embodiments of the invention the equipment comprises a supplement for chewing surfaces, which may be adhered (e.g. using adhesive) to the teeth. In particular, after conventional or incomplete orthodontist treatment the teeth arches in the upper jaw and/or the lower jaw may be arranged asymmetrical. As a result, the jaw joint may be unevenly loaded and discomfort or pain may result. According to the embodiment of the present invention, the chewing surfaces may be formed such that, despite of the improper positioning of the tooth roots, an improved chewing motion may be achieved by suitably supplementing the natural chewing surfaces such that as a result, the supplemented chewing surface of symmetry related teeth are connectable by a teeth connecting line being parallel to the internal ear axis.

According to an embodiment of the present invention an (entire) teeth arch of the upper jaw or the lower jaw is provided which is configured for achieving a target denture geometry having a target denture plane lying parallel to the inner ear line. The teeth arch may comprise natural and/or artificial teeth. The teeth arch may be configured such that a teeth connecting line connecting symmetry related teeth (in the upper jaw or the lower jaw) is parallel to the internal ear line.

According to a further embodiment of the present invention a teeth arch is arranged or placed within the denture or the upper jaw and the lower jaw such that symmetry related teeth are connectable with a teeth connecting line being parallel to the internal ear line. Thereby, the denture plane of the teeth arch is obtainable by rotation of a cranial plane around an axis parallel to the internal ear line. Furthermore, incisor teeth may be symmetrical arranged with respect to an (pseudo-) mirror plane being arranged at a center between the right eye and the left eye. The positioning of the teeth arch may be achieved in one or more steps or stages.

FIG. 7 schematically illustrates four transitional denture planes considered and achieved according to embodiments of the present invention. Thereby, the teeth arch 55 comprised of teeth 57 exhibits an uneven positioning of the teeth 57, wherein the molar teeth 4, 5, 6 in the left jaw are positioned too far to the rear, while they are positioned in the right jaw too far to the front. As a consequence, the transversal line TL1 is inclined relative to the internal ear line 11 (for illustration ear line 11_1 parallel to the ear line 11 is illustrated intersecting the transversal line TL1 at an angle).

In a first treatment stage the start denture geometry represented by the teeth arch 55 is treated by an equipment according to embodiments of the present invention, for example comprising a brace and/or a bracket for repositioning the teeth 57. After a treatment period the stage as illustrated by the teeth arch 59 having teeth 61 is achieved. Thereby, the transversal line TL2 still deviates from being parallel to the internal ear line 11 (for illustration a parallel line 11_2 is illustrated intersecting the transversal line TL2) but the deviation is diminished. The treatment now involves application of a slightly differently designed brace and/or bracket, which also aims for readjustment the teeth such that the transversal lines are parallel to the internal ear line 11. Thereby, the teeth arch 63 having teeth 65 is achieved for which the transversal line TL3 has only a slight deviation from being parallel to the internal ear line 11. The final stage of the teeth arch 67 having teeth 69 is characterized by a transversal line TL4 which is almost parallel to the internal ear line 11, while the denture plane is close to the target denture plane.

The stage of the teeth arch 55 may be considered as a starting dentures geometry, in which the transversal lines 41, TL1 are not all parallel to the internal ear line 11. During treatment planning a number of virtual transitional stages or transitional denture planes may be constructed which may converge to the target denture plane. Accordingly, for each transitional denture plane correspondingly configured equipment may be manufactured or arranged, in order to achieve a stepwise establishment of the target denture geometry.

Figure 8:
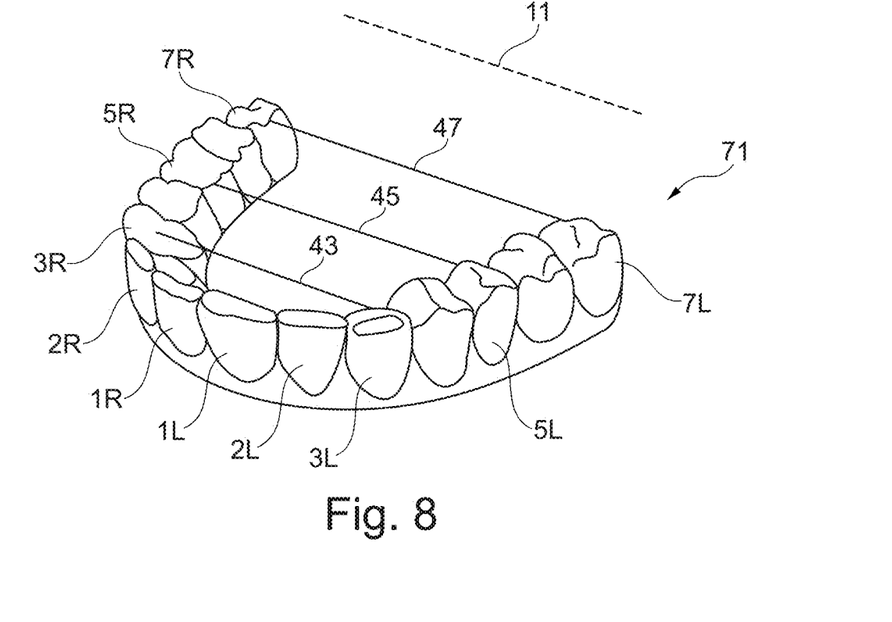
FIG. 8 schematically illustrates an example of equipment for treatment of a person according to an embodiment of the present invention.
Figure 9:
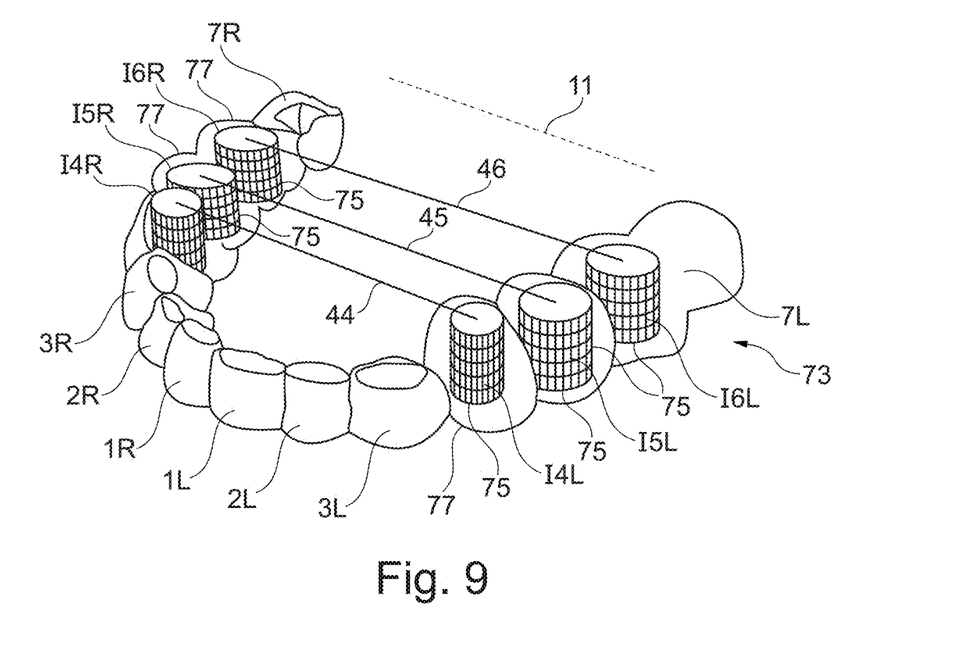
FIG. 9 schematically illustrates an example of equipment for treatment of a person according to an embodiment of the present invention.

FIGS. 8 and 9 schematically illustrate a number of examples of equipment which may be provided according to the embodiments of the present invention.

FIG. 8 illustrates a (transparent) aligner element 71 that is put over teeth of the lower jaw for readjusting positions of the teeth. Thereby, the teeth are labeled with their positions in the left and right portion of the jaw. The teeth connecting lines 43, 45, 47 connecting symmetry related teeth are almost parallel to the internal ear line 11.

FIG. 9 illustrates a drilling aid or pattern for defining drilling locations and directions. Into the drilled holes implant pins 75 are inserted and artificial teeth (or an artificial teeth arch) are attached to the pins 75 such that teeth connecting lines 44, 45, 46 are parallel to the internal ear line 11.

The definition of the internal ear axis may e.g. involve 3D imaging and analyzing imaging results which are exemplary and schematically illustrated in FIGS. 2, 5 and 6. Thereby the positions of the internal ear points 7 and 9 may be (automatically and/or manually) localized and marked and displayed on a screen. Optionally a viewing plane of viewing the 3D imaging data may be oriented such that the internal ear line is within the screen plan and is clearly visible. The internal ear points may also be detected using pattern recognition searching for reference patterns in the 3D data set. The internal ear points may the be connected by a line defining the internal ear line which may also be displayed. At least one eye point of at least one eye may be (manually or automatically) detected and marked and displayed. The eye points may be connected and the connecting line may be displayed. Alternatively, a line parallel to the internal ear line through one of the eyes may be constructed and displayed. Optionally, the viewing direction of the screen may be adjusted such that a plane defined by the two internal ear points and at least one eye point is in the plane of the screen (as illustrated in FIG. 5). The thereby defined cranial plane may be displayed. Further the cranial (pseudo) mirror symmetry plane may be determined (as explained above) and displayed, optionally such that the mirror symmetry plane is in the plane of the screen (as illustrated in FIG. 6). Further the connecting line connecting the internal ear line and the eye line may be displayed. The cranial plane may (automatically or manually) be rotated interactively on the screen around the internal ear line and optionally be translated to obtain the target denture plane, optionally showing the rear rotation axis, e.g. in a side view as illustrated in FIG. 6. Data defining the target denture plane may then be output to a manufacturing system for manufacturing equipment for treating a person.

The invention claimed is:

1. A method, the method comprising:
    measuring a left internal ear point of a person, wherein the left internal ear point is a location beyond a left eardrum of a left ear towards the interior of the left ear;
    measuring a right internal ear point of the person, wherein the right internal ear point is a location beyond a right eardrum of a right ear towards the interior of the right ear;
    defining an internal ear line through the left internal ear point and the right internal ear point;
    defining a chewing base plane for the person, the chewing base plane lying parallel to the internal ear line; and defining an auxiliary plane based on one or more of
- (i) a left triangle plane of a left triangle defined by the left internal ear point, the right internal ear point, and a left eye point of a left eye, and
- (ii) a right triangle plane of a right triangle defined by the left internal ear point, the right internal ear point, and a right eye point of a right eye, wherein the internal ear line lies within the auxiliary plane, and wherein the auxiliary plane is rotated around a rear rotation axis being parallel to the internal ear line about an angle between 11° and 17° downwards to obtain the chewing base plane, wherein the rear rotation axis is obtained by:
- constructing a connecting line intersecting the internal ear line in a middle between the left internal ear point and the right internal ear point and intersecting an eye line in the middle between the left eye point and the right eye point;
- obtaining a connection length of the connecting line between the internal ear line and the eye line; and
- extending the connecting line in a rear direction by between 1.7 and 2.3 times the connection length, wherein an end of the extended connecting line defines a position of the rear rotation axis;

generating data defining the chewing base plane to characterize a configuration of an equipment for the treatment of the person, such that applying the equipment to the person achieves a target denture geometry characterized by the chewing base plane;

supplying said data defining the chewing base plane to a manufacturing system; and manufacturing the equipment for the treatment of the person based on said data defining the chewing base plane using the manufacturing system, wherein applying the equipment to the person achieves the target denture geometry.

2. A method, the method comprising:
measuring a left internal ear point of a person;
measuring a right internal ear point of the person;
defining an internal ear line through the left internal ear point and the right internal ear point;
defining an auxiliary plane based on one or more of
- (i) a left triangle plane of a left triangle defined by the left internal ear point, the right internal ear point, and a left eye point of a left eye, and
- (ii) a right triangle plane of a right triangle defined by the left internal ear point, the right internal ear point, and a right eye point of a right eye, wherein the internal ear line lies within the auxiliary plane, wherein
- a) the left eye point is one of
  - (i) a center or of a highest curvature of a cornea of the left eye, and
  - (ii) a center of an eyeball of the left eye, and/or
- b) the right eye point is one of
  - (i) a center or of a highest curvature of a cornea of the right eye, and
  - (ii) a center of an eyeball of the right eye, and defining a chewing base plane for the person by rotating the auxiliary plane downward around a rear rotation axis, the chewing base plane lying parallel to the internal ear line and oblique to the auxiliary plane;

generating data defining the chewing base plane to characterize a configuration of an equipment for the treatment of the person, such that applying the equipment to the person achieves a target denture geometry characterized by the chewing base plane;

supplying said data defining the chewing base plane to a manufacturing system; and manufacturing the equipment for the treatment of the person based on said data defining the chewing base plane using the manufacturing system, wherein applying the equipment to the person achieves the target denture geometry.

3. A method, the method comprising:
measuring a left internal ear point of a person;
measuring a right internal ear point of the person;
defining an internal ear line through the left internal ear point and the right internal ear point;
defining a chewing base plane for the person, the chewing base plane lying parallel to the internal ear line;
defining an auxiliary plane based on one or more of
- (i) a left triangle plane of a left triangle defined by the left internal ear point, the right internal ear point, and a left eye point of a left eye, and
- (ii) a right triangle plane of a right triangle defined by the left internal ear point, the right internal ear point, and a right eye point of a right eye, wherein the internal ear line lies within the auxiliary plane, wherein the auxiliary plane is rotated around a rear rotation axis being parallel to the internal ear line about an angle between 11° and 17° downwards to obtain the chewing base plane;

wherein the rear rotation axis is obtained by:
- constructing a connecting line intersecting the internal ear line in a middle between the left internal ear point and the right internal ear point and intersecting an eye line in the middle between the left eye point and the right eye point;
- obtaining a connection length of the connecting line between the internal ear line and the eye line; and
- extending the connecting line in a rear direction by between 1.7 and 2.3 times the connection length, wherein an end of the extended connecting line defines a position of the rear rotation axis;

generating data defining the chewing base plane to characterize a configuration of an equipment for the treatment of the person, such that applying the equipment to the person achieves a target denture geometry characterized by the chewing base plane;

supplying said data defining the chewing base plane to a manufacturing system; and manufacturing the equipment for the treatment of the person based on said data defining the chewing base plane using the manufacturing system, wherein applying the equipment to the person achieves the target denture geometry.

4. The method of claim 3, the left eye point being one of (i) a center or of a highest curvature of a cornea of the left eye, and (ii) a center of an eyeball of the left eye.

5. The method of claim 3, the right eye point being one of (i) a center or of a highest curvature of a cornea of the right eye, and (ii) a center of an eyeball of the right eye.

6. The method of claim 3, further comprising:
displaying, on a display screen, at least one of the left internal ear point, the right internal ear point, the internal ear line, the left eye point, the right eye point, the auxiliary plane, and the chewing base plane.

7. The method of claim 6, wherein at least one of the left internal ear point, the right internal ear point, the internal ear line, the left eye point, the right eye point, the auxiliary plane, and the chewing base plane is superimposed with imaging data relating to a skull of the person.

8. The method of claim 3, wherein the internal ear points are measured by imaging methodology, and wherein the method can be implemented by a computer.

9. The method of claim 8, wherein the manufacturing system comprises a 3D printer or a 3D lithography machine.

10. The method of claim 8, wherein the equipment comprises at least one of a set of intermediate equipment portions that are configured to achieve the target denture geometry having the chewing base plane starting from a start denture geometry characterized by a start denture plane in plural stages involving successively achieving transitional denture planes that are between the start denture plane and the chewing base plane.

11. The method of claim 8, wherein the equipment is configured to achieve the target denture geometry having the chewing base plane starting from a start denture geometry characterized by a start denture plane in one stage without achieving transitional denture planes.

12. The method of claim 8, wherein the equipment is configured:
   to readjust a position of at least one tooth in an upper jaw and/or a lower jaw;
   to be implanted in the upper jaw and/or the lower jaw;
   to be attached as supplement to at least one tooth or an inserted artificial pin in the upper jaw and/or the lower jaw; and/or
   to replace at least one tooth in the upper jaw and/or the lower jaw.

13. The method of claim 8, wherein the equipment comprises at least one of:
   a dental auxiliary structure for repositioning of teeth, a dental brace, a dental retainer, a bracket, a dental aligner, a bore pattern, a bore model, a boring template, an overdenture, an overlay prosthesis, a dental prosthesis, a transitional dental prosthesis, a dental crown, an inlay, a dental filling, an artificial tooth, and an implant.

14. The method of claim 3, the chewing base plane being further defined by a target geometry of an upper teeth arch and a lower teeth arch such that, in each teeth arch, teeth are positioned such that a teeth connecting line extending between opposing teeth of the same tooth number in the lower teeth arch or the upper teeth arch is parallel to the internal ear line,
   wherein the target geometry of the upper teeth arch and the lower teeth arch may be achieved step by step including one or more intermediate geometries.

15. The method of claim 3, wherein the chewing base plane is characterized by chewing surfaces of teeth approximately lying in the chewing base plane but deviating downwards from the chewing base plane in a middle region between incisor teeth and a last molar tooth.

16. The method of claim 3, wherein the left internal ear point is a location of an anatomical structure beyond the left eardrum within a middle ear or an inner ear of the left ear, wherein the location comprises:
   a center of a left cochlea,
   a location of a left ear bone or an ossicle directly or indirectly connected to the left eardrum,
   a location of an utricle or a saccule of a left inner ear,
   a location of a malleus or a hammer of the left ear, or
   a location of an incus of the left ear,
   such that the left internal ear point is different from a location of an entry into a left outer ear canal.

17. The method of claim 3, wherein the right internal ear point is a location of an anatomical structure beyond the right eardrum within a middle ear or an inner ear of the right ear, wherein the location comprises:
   a center of a right cochlea,
   a location of a right ear bone or an ossicle directly or indirectly connected to the right eardrum,
   a location of an utricle or a saccule of a right inner ear,
   a location of a malleus or a hammer of the right ear, or
   a location of an incus of the right ear,
   such that the right internal ear point is different from a location of an entry into a right outer ear canal.

18. The method of claim 3, further comprising: transmitting the data defining the chewing base plane of the person to an end user.

* * * * *